3,373,107
FRICTION PRESSURE REDUCING AGENTS
FOR LIQUIDS
Herbert L. Rice, Kenneth W. Becker, and Frank L. Szabo,
Houston, Tex., assignors to Milchem Incorporated,
Houston, Tex., a corporation of Delaware
No Drawing. Filed July 16, 1964, Ser. No. 383,230
2 Claims. (Cl. 252—8.55)

ABSTRACT OF THE DISCLOSURE

Friction pressure reducing compositions including cationic compounds generally characterized as alkyl-substituted mono- or poly-functional amines in which at least one alkyl group contains from 16–20 carbons having a straight-chain segment of at least 16 carbon atoms.

---

This invention relates to friction pressure reducing agents for use in liquids and especially for well stimulation fluids, such as fracturing and acidizing fluids and water floods employed in order to increase or initiate flow of oil therefrom, and to well stimulation fluids containing such agents.

The fluids commonly employed for various well stimulation purposes may be either oil or water base fluids, the water base fluids being variously fresh water, sodium chloride or calcium chloride brines of varying compositions and other electrolytes, particularly acid solutions, such as HCl, of different concentrations.

Pumping of such fluids through tubing into the wells at the volumes and pressures required usually results in turbulent flow which, in turn, generates a high degree of friction and resulting pressure drop in the pipe, requiring excessive amounts of power and pumping apparatus at the surface to deliver the fluids at suitable rates and pressures in the zones to be treated. The friction losses will vary with the character of the fluid and the different fluids will usually require different friction pressure reducing agents.

Friction pressure reducing agents heretofore employed are generally of solid character, such as guar gum and various synthetic high polymers which are useable in only relatively small proportions in most base fluids, are not readily soluble or dispersible in the base fluids, requiring relatively extended hydration periods involving considerable time and expense in preparation. Also, dispersions of guar gum are subject to hydrolysis in some of the base fluids which are electrolytes, as well as in fresh water, and these and the polymeric types may be subject to serious shear break-down under conditions of turbulence.

Accordingly, it is a primary object of the present invention to provide novel friction pressure reducing agents which have none of the disadvantages of existing friction pressure reducing agents, such as enumerated above.

It is an important object to provide friction pressure reducing agents which are generally non-polymeric in structure; are suitable for use in water, oil or aqueous electrolytes; are normally liquids which are readily soluble or disperse in any desired proportions in the base fluids; require no extended hydration or dispersion periods; are not subject to hydrolysis when used in water base fluids; and are not subject to shear break-down under conditions of turbulence.

Another important object is to provide well stimulation fluids comprising a base fluid of the general character mentioned containing a suitable proportion of one or more of the friction pressure reducing agents in accordance with this invention.

Friction pressure reducing agents in accordance with this invention may be generally characterized as cationic chemical compounds which, either directly or in water-alcohol solutions, are readily dispersible in base fluids which may be fresh water, kerosene or other petroleum-derived hydrocarbon fractions, crude oil and the like, aqueous electrolytes including brines of various concentrations of NaCl and $CaCl_2$ and aqueous solutions of HCl and other acids used in well-treating and well-stimulation operations.

The friction pressure reducing agents in accordance with this invention may be chemically generally characterized as alkyl-substituted mono- or poly-functional amines in which at least one alkyl group contains from 16 to 22 carbons having a straight-chain segment containing at least 16 carbons, which segment may preferably be a fatty acid or fatty acid-derived radical having a chain length of from 16 to 18 carbons, inclusive.

More specifically, the friction pressure reducing agents herein contemplated are selected from the class consisting of amines having the general formulae:

(A)

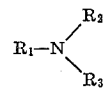

wherein $R_1$ is an alkyl group of from 16 to 22 carbon atoms including a straight-chain segment of at least 16 carbon atoms, which alkyl groups may be an alkyl fatty acid or fatty acid-derived radical having a carbon chain length of from 16 to 18, inclusive; $R_2$ and $R_3$, one or both, are H, or $C_nH_{2n+1}$ where $n$ is 1, 2 or 3, or the group $(C_2H_4O)_xH$ where $x$ is an integer from 1 to 30, inclusive, for the total of all such groups;

(B)

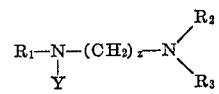

where $R_1$, $R_2$, and $R_3$ are the same as in A; Y is H, $CH_3$, or the group $(C_2H_4O)_xH$ where $x$ is the same as in A and $z$ is 2, 3, or 4;

(C) The oxides and inner-ionic salts of those compounds under A and B which are tertiary amines; and (D) Mixtures of any two or more of the compounds under A, B, and C.

Following are some examples of specific compounds coming under the classes included in the above general formulae:

Class A (1) N-tallow, N,N-dimethyl amine (tertiary).
(2) Polyoxyethylene (2 mol) oxide adduct of tallow amine (tertiary).
(3) N-tallow, N-methyl, N-ethanol amine (tertiary).
(4) N-hydrogenated tallow, N,N-dimethyl amine (tertiary).
(5) Polyoxyethylene (5 mol) oxide adduct of tallow amine.
(6) Polyoxyethylene (5 mol) oxide adduct of soya amine.
(7) Polyoxyethylene (5 mol) oxide adduct of oleyl amine.
(8) N,N-dimethyl, N-hexadecyl amine (tertiary).
(9) Polyoxyethylene (15 mol) oxide adduct of tallow amine.
(10) Oleyl amine (primary).

Class B (1) N-tallow, $N,N^1$-propylene diamine.
(2) Polyoxyethylene (2 mol) oxide adduct of diamine (1).

(3) Polyoxyethylene (3 mol) oxide adduct of diamine (1).

(4) Polyoxyethylene (10 mol) oxide adduct of diamine (1).

Class C (1) The oxides of Class A compounds 1, 2, 3, 4, and 8.
(2) The sodium chloroacetate betaines of Class A compounds 1, 2, 3, 4, and 8.
(3) The oxide or betaine of Class B compound 3.

The various fatty acid substituted amines which form the principal constituents of the compounds included in the defined class are generally commercially available. Some of the tertiary amine oxides are also generally available commercially but may be readily prepared from the corresponding amine by known procedures involving simple oxidation of the amine in an inert solvent solution with appropriate molal proportions of hydrogen peroxide.

The oxyethylation adducts may also be prepared by well-known procedures in which the amine is reacted with the proper molal proportions of ethylene oxide at suitable temperature and pressure in the presence or absence of alkaline catalyst, depending on whether two or more mols of ethylene oxide are to be added.

Determination of the friction pressure reduction obtainable with the various compounds in accordance with this invention may be made by relatively simple laboratory procedures by pumping various base fluids containing measured proportions of the compounds, under standardized conditions, from a suitable reservoir through a ⅛-inch stainless steel tube. The pressure differential developed between gauges spaced four feet apart in the tube was recorded. The percent of friction loss reduction was calculated from the initial pressure differential of the system for fresh water or other base fluid containing no additive and that for the same base fluid containing varying amounts of the friction pressure reducing compounds being compared.

Following are a number of specific examples of compositions and the friction pressure reduction obtained therewith:

EXAMPLE 1

A solution in water and isopropanol containing 25% by weight of dimethyl hydrogenated tallow tertiary amine (DMHT) oxide and 6.2% by weight of dimethyl hydrogenated tallow tertiary amine gave a 72% reduction of the friction pressure developed by tap water. The friction pressure reduction was obtained within one minute after addition of 0.6% by volume of the solution to the feed reservoir. A minimum of agitation was used to mix the two liquids in the reservoir. The quantity of the friction pressure reducing agent in the base fluid was less than 0.2% by weight of the fluid.

EXAMPLE 2

A solution in isopropanol and Panasol AN–2K (heavy aromatic naphtha) containing, by weight, 30% dimethyl hydrogenated tallow tertiary amine gave a 69% reduction of the friction pressure within one minute after addition of 0.75% by volume of the solution to the reservoir. (Approximately 0.225% of active ingredient.) A minimum of agitation was used to mix the two liquids in the reservoir and no shear break-down or loss of effectiveness of the test solution occurred in more than one hour of recirculating the test fluid containing the friction pressure reduction additive.

EXAMPLE 3

A solution in isopropanol and water containing 25% by weight of dimethyl hydrogenated tallow tertiary amine was observed to give 65% reduction of friction pressure within one minute after addition of 1% by volume of the solution to the feed reservoir with minimum agitation. No shear break-down occurred when the mixture in the reservoir was subjected to severe agitation with a homogenizer, and no loss of effectiveness of the solution as mixed in the reservoir occurred after more than one hour of continuous pump recirculation.

EXAMPLE 4

A solution in isopropanol and water containing 30% by weight of dimethyl hydrogenated tallow tertiary amine oxide was found to give a 50% reduction in friction pressure encountered in pumping a 10% by weight of sodium chloride solution in the test system when 0.8% by volume of the solution was added to the feed reservoir containing the sodium chloride solution.

EXAMPLE 5

A mixture containing, by weight, 35% of the 5-mol ethylene oxide adduct of distilled soya amine, 20% dimethyl hydrogenated tallow amine oxide and 2% dimethyl hydrogenated tallow amine in water and isopropanol when added at 0.114% by weight (based on 100% actives) to fresh water, gave 71% friction pressure reduction in the test system. The pressure reduction was obtained for the durtion of the test (one hour). No shear or agitation sensitivity was observed.

EXAMPLE 6

A blend containing, by weight, 2% dimethyl hydrogenated tallow amine, 25% dimethyl hydrogenated tallow amine sodium chloroacetate betaine and 15% 5-mol ethylene oxide adduct of distilled soya amine in isopropanol-water solution when added at 0.126% by weight (based on 100% actives) to fresh water gave 50% friction pressure reduction in the test system. The presure reduction was obtained within one minute and this reduction was maintained for one hour of circulation, the duration of the test. No shear or agitation sensitivity was observed.

EXAMPLE 7

A blend containing 15% DMHT amine oxide and 20% 5-mol ethylene oxide adduct of distilled soya amine formulated in isopropanol and water when added at 0.071% by weight (based on 100% actives) to fresh water gave 69% friction pressure reduction in the test system within one minute, and this reduction was maintained for the one hour duration of the test. No shear or agitation sensitivity was observed.

EXAMPLE 8

40% by volume of 5 mol ethylene oxide adduct of distilled soya amine in isopropanol and water solution when added at 0.35% by weight (based on 100% actives) to fresh water gave a 46% reduction of friction pressure in the test system within one minute and was maintained throughout the test period of one hour. No agitation or shear sensitivity was observed.

EXAMPLE 9

25% by weight of DMHT amine oxide in isopropanol-water solution added at .025% by weight (based on 100% actives) to fresh water gave a 68% reduction of friction pressure in the test system.

EXAMPLE 10

A mixture containing, by weight, 6.2% DMHT amine oxide in isopropanol and water when added at 0.15% by weight (based on 100% actives) to fresh water gave a 61% reduction of the friction pressure in the test system.

EXAMPLE 11

A mixture containing, by weight, 2% DMHT amine, 15% DMHT amine oxide and 20% 5-mol ethylene oxide adduct of distilled soya amine in isopropanol-water solution, when added at 0.071% by weight (based on 100% actives) to fresh water, gave a 69% reduction of friction pressure in the system.

Friction pressure reduction agents of the general character contemplated by this invention will, when added to the base fluids, produce a gel structure which provides visible evidence which tends to characterize the resulting solution as capable of effecting a reduction in the friction pressure. Such visible evidence was obtained in the following examples, although pumping tests were not employed.

EXAMPLE 12

The characterizing gel structure was observed upon the addition to a saturated sodium chloride solution of 0.3% by volume of a solution of isopropanol-water containing 25% by weight of the sodium chloroacetate betaine of dimethyl hydrogenated tallow tertiary amine.

EXAMPLE 13

Evidence of the desired gel structure was observed in a 15% HCl solution by the addition of 0.7% by volume of an isopropanol-water solution containing 30% by weight of dimethyl soya tertiary amine oxide. No break-down of this gel structure was evident after two weeks of standing of the system at room temperature.

EXAMPLE 14

Visible evidence of the desired gel structure was observed in a 35% $CaCl_2$ solution upon the addition thereto of 0.3% by volume of an isopropanol-water solution containing 25% by weight of dimethyl hydrogenated tallow tertiary amine oxide.

Wherever used in the foregoing examples, the term "dimethyl hydrogenated tallow tertiary amine" or the acronym "DMHT" shall be understood to refer to the partially hydrogenated compound, i.e. a compound which has been hydrogenated to an Iodine Value of not less than about 11.0

In general, the quantity of friction pressure reducing agent required will fall within the range from about 0.05% to about 1.0% by weight in the base fluids. The proportions of the friction pressure reducing agents may comprise various mixtures of the several different materials listed above, the proportions being varied generally in relation to the kind of base fluid, and in particular, the character and concentrations of the acids or salts contained therein.

In general, the preparation of the final well stimulation fluid is very simple. The selected friction pressure reducing agent, either a single compound or mixture of two or more will be dissolved in any conventional solvent capable of dissolving the compound and dispersing it completely in the base fluid. The solvent may be water, one of the lower aliphatic alcohols, isopropanol being preferred for its relatively low cost and effectiveness, an aromatic naphtha such as benzene, toluene, xylene, terpenes, and the like, petroleum napthas, and mixtures of the various solvents. The selection of the solvent or mixture of solvents, will be evident to those skilled in the art.

Thus, in all cases, the preparation of the final fluid will be accomplished by adding to the base liquid a compatible liquid composition, thereby enabling quick and complete admixing in all practical proportions.

The solution containing the friction pressure reducing agent may be formulated in any suitable proportions of agent to solvent. In general, such solutions will contain from about 15% to about 85% by weight of the friction pressure reducing compound.

The solution will then be added to the base liquid in the desired proportions, being generally admixed in the proportions of from about 1.0 to about 3.0 gallons of solution per 1000 gallons of base liquid. The solution of friction pressure reducing agent may be added to the base liquid in a tank and stirred therein, or may be added by means of a proportioning pump to a stream of the base liquid being pumped into a well.

Not only do the compositions in accordance with this invention, effect substantial reduction in the friction pressure developed in the pumping of the base fluids, but they also will reduce substantially the friction factor encountered in the turbulent flow of the liquid system, as for example, the movement of the base fluid past a solid surface, whether that surface be a pipe wall, an earth formation, or by the passage of a boat bottom or other solid object at high speed through water.

It will be understood that numerous modifications and variations may be made in the compositions in accordance with this inventioon within the scope of the appended claims but without departing from the spirit of this invention.

What we claim and desire to secure by Letters Patent is:

1. A well stimulating fluid consisting essentially of fresh water as a base liquid, and a friction pressure reducing composition dispersed therein, said friction pressure reducing composition consisting of a solvent containing 25% of dimethyl hydrogenated tallow tertiary amine oxide and 6.2% of dimethyl hydrogenated tallow tertiary amine by weight of said solvent, and said solvent consisting of a mixture of isopropanol and water.

2. A well stimulation fluid consisting essentially of kerosene and a friction pressure reducing composition dispersed therein, said friction pressure reducing composition consisting of a solvent containing 25% of dimethyl hydrogenated tallow tertiary amine oxide and 6.2% of dimethyl hydrogenated tallow tertiary amine by weight of said solvent, and said solvent consisting of a mixture of isopropanol and heavy aromatic naptha.

References Cited

UNITED STATES PATENTS

| | | | |
|---|---|---|---|
| 2,460,259 | 1/1949 | Kahler | 252—8.55 X |
| 2,802,531 | 8/1957 | Cardwell et al. | 252—8.55 |
| 2,867,279 | 1/1959 | Cocks | 252—8.55 |
| 3,007,784 | 11/1961 | Ebner | 44—72 |
| 3,098,794 | 7/1963 | Dohr et al. | 260—583 X |
| 3,199,591 | 8/1965 | Kepley | 252—8.55 |
| 3,215,154 | 1/1965 | White et al. | 252—8.66 |
| 3,215,741 | 11/1965 | Chadwick | 260—583 |

LEON D. ROSDOL, *Primary Examiner.*

HERBERT B. GUYNN, *Examiner.*